(12) United States Patent
Stice et al.

(10) Patent No.: US 10,159,104 B2
(45) Date of Patent: *Dec. 18, 2018

(54) ENABLING WIRELESS CONNECTIVITY FOR DEVICES

(71) Applicant: AT&T Mobility II LLC, Atlanta, GA (US)

(72) Inventors: Michael David Stice, Atlanta, GA (US); Andy P. Salvador, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/268,664

(22) Filed: Sep. 19, 2016

(65) Prior Publication Data

US 2017/0006654 A1 Jan. 5, 2017

Related U.S. Application Data

(63) Continuation of application No. 14/193,356, filed on Feb. 28, 2014, now Pat. No. 9,451,656.

(51) Int. Cl.

| | |
|---|---|
| *H04W 76/14* | (2018.01) |
| *G06F 11/30* | (2006.01) |
| *G06F 21/44* | (2013.01) |
| *H04W 12/06* | (2009.01) |
| *H04W 88/08* | (2009.01) |

(Continued)

(52) U.S. Cl.
CPC ......... *H04W 76/14* (2018.02); *G06F 11/3051* (2013.01); *G06F 21/44* (2013.01); *H04L 12/00* (2013.01); *H04L 63/0853* (2013.01); *H04L 63/0884* (2013.01); *H04W 8/20* (2013.01); *H04W 12/06* (2013.01); *H04W 88/04* (2013.01); *H04W 88/08* (2013.01); *G06F 2221/2129* (2013.01); *H04W 8/005* (2013.01);

(Continued)

(58) Field of Classification Search
CPC .............................. H04L 65/00; H04L 67/00
See application file for complete search history.

(56) References Cited

U.S. PATENT DOCUMENTS

| | | | |
|---|---|---|---|
| 7,821,987 B2 | 10/2010 | Rodriguez et al. | |
| 7,860,725 B2 | 12/2010 | Gopinathan | |

(Continued)

FOREIGN PATENT DOCUMENTS

| | | |
|---|---|---|
| WO | WO 02/30145 | 4/2002 |
| WO | WO 2013/000701 | 1/2013 |

(Continued)

OTHER PUBLICATIONS

Keith Shaw, NetworkWorld Protect: Cases for your smartphone or tablet, all pages (Year: 2012).*

(Continued)

*Primary Examiner* — David E Martinez
(74) *Attorney, Agent, or Firm* — Hartman & Citrin LLC

(57) ABSTRACT

Concepts and technologies are disclosed herein for enabling wireless connectivity for devices. A device can pair with a peripheral device and initiate provisioning of services to support communication with a network via the peripheral device. The device can detect completion of the provisioning, and communicate with the network via the peripheral device.

20 Claims, 10 Drawing Sheets

(51) Int. Cl.
  *H04W 88/04* (2009.01)
  *H04L 12/00* (2006.01)
  *H04W 8/20* (2009.01)
  *H04L 29/06* (2006.01)
  *H04W 8/00* (2009.01)
  *H04W 84/12* (2009.01)
  *H04W 84/20* (2009.01)
  *H04W 88/06* (2009.01)

(52) U.S. Cl.
  CPC ............ *H04W 84/12* (2013.01); *H04W 84/20* (2013.01); *H04W 88/06* (2013.01)

(56) References Cited

U.S. PATENT DOCUMENTS

| | | |
|---|---|---|
| 8,364,148 B2 | 1/2013 | Dravida et al. |
| 8,405,502 B2 | 3/2013 | Teague |
| 8,488,541 B2 | 7/2013 | Schlack |
| 8,565,204 B2 | 10/2013 | Kalhan |
| 8,630,272 B2 | 1/2014 | Park et al. |
| 8,831,517 B2 | 9/2014 | Shankaranarayanan et al. |
| 8,948,728 B2 | 2/2015 | Haberman |
| 9,088,672 B2 | 7/2015 | Shankaranarayanan et al. |
| 2002/0173704 A1 | 11/2002 | Schulze |
| 2004/0053599 A1 | 3/2004 | Karaoguz et al. |
| 2004/0077374 A1 | 4/2004 | Terry |
| 2004/0193684 A1 | 9/2004 | Ben-Yoseph |
| 2006/0031515 A1 | 2/2006 | Van Gassel |
| 2006/0172769 A1 | 8/2006 | Oh |
| 2007/0032225 A1 | 2/2007 | Konicek |
| 2007/0124809 A1 | 5/2007 | Narin et al. |
| 2008/0033802 A1 | 2/2008 | McKenna |
| 2008/0058614 A1 | 3/2008 | Banet |
| 2008/0146277 A1 | 6/2008 | Anglin |
| 2009/0005005 A1 | 1/2009 | Forstall et al. |
| 2009/0125413 A1 | 5/2009 | Le Chevalier |
| 2009/0177996 A1 | 7/2009 | Hunt |
| 2010/0017471 A1 | 1/2010 | Brown |
| 2010/0205099 A1 | 8/2010 | Ahmavaara et al. |
| 2010/0227585 A1 | 9/2010 | Carroll |
| 2011/0055901 A1 | 3/2011 | Karaoguz et al. |
| 2011/0087782 A1 | 4/2011 | Bouckaert et al. |
| 2011/0294502 A1 | 12/2011 | Oerton |
| 2012/0054353 A1 | 3/2012 | Jung et al. |
| 2012/0079043 A1 | 3/2012 | Brown et al. |
| 2012/0116886 A1 | 5/2012 | Manku |
| 2012/0155380 A1 | 6/2012 | Hodges |
| 2012/0264375 A1 | 10/2012 | Shankaranarayanan |
| 2013/0219471 A1 | 8/2013 | Brown et al. |
| 2013/0238473 A1 | 9/2013 | Fan et al. |
| 2013/0242969 A1 | 9/2013 | Schlack |
| 2013/0272227 A1 | 10/2013 | Gallagher et al. |
| 2013/0272228 A1 | 10/2013 | Gallagher et al. |
| 2013/0273956 A1 | 10/2013 | Gallagher et al. |
| 2013/0331028 A1 | 12/2013 | Kuehnel et al. |
| 2015/0003432 A1* | 1/2015 | Tanaka ............... H04W 36/34 370/338 |
| 2015/0319804 A1 | 11/2015 | Shankaranarayanan et al. |
| 2016/0095017 A1 | 3/2016 | Ely |

FOREIGN PATENT DOCUMENTS

| | | |
|---|---|---|
| WO | WO 2013/095382 | 6/2013 |
| WO | WO 2013/147823 | 10/2013 |

OTHER PUBLICATIONS

U.S. Office Action dated Jul. 29, 2013 in U.S. Appl. No. 13/086,387.
U.S. Office Action dated Dec. 13, 2013 in U.S. Appl. No. 13/086,387.
U.S. Notice of Allowance dated Apr. 28, 2014 in U.S. Appl. No. 13/086,387.
U.S. Office Action dated May 6, 2015 in U.S. Appl. No. 14/193,356.
U.S. Notice of Allowance dated Dec. 15, 2015 in U.S. Appl. No. 14/193,356.
U.S. Notice of Allowance dated Jan. 11, 2016 in U.S. Appl. No. 14/193,356.
U.S. Notice of Allowance dated Mar. 31, 2016 in U.S. Appl. No. 14/193,356.
U.S. Notice of Allowance dated Mar. 12, 2015 in U.S. Appl. No. 14/448,312.
U.S. Office Action dated Jun. 10, 2016 in U.S. Appl. No. 14/663,996.
U.S. Office Action dated Oct. 1, 2015 in U.S. Appl. No. 14/753,089.
U.S. Notice of Allowance dated Feb. 10, 2016 in U.S. Appl. No. 14/753,089.
U.S. Appl. No. 14/663,996, filed Mar. 20, 2015.
ISR and WO dated Jun. 9, 2015 in PCT Application No. PCT/US2015/017752.
"Surface blades: Microsoft bets on accessories as the future of tablets," Sep. 24, 2013, retrieved from http://www.theverge.com/2013/9/24/4765048/can-microsofts-futuristic-blade-accessories-give-the-surface-the-edge on Feb. 19, 2014.
"IMEC: 7Gbit/s 60GHz wireless transceiver for tablets," May 2012, retrieved from http://www.electronicsweekly.com/news/design/communications/imec-7gbits-60ghz-wireless-transceiver-for-tablets-2012-05/ on Feb. 19, 2014.
"Sierra Wireless outs thinnest-ever 4G LTE module, teases skinny AT&T-ready laptops and tablets," Jun. 7, 2012, retrieved from http://www.engadget.com/2012/06/07/sierra-wireless-em7700 4g lte module/ on Feb. 19, 2014.
"Wireless Accessory Kit," 2012, retrieved from https://store.wacom.com/us/en/product/ACK40401 on Feb. 19, 2014.
"Sierra Wireless launches new generation 40 LTE modules for notebooks and tablets," Feb. 4, 2014, retrieved from http://www.sierrawireless.com/en/Newsroom/newsreleases/2014/020414- Sierra_Wireless_launches_newgenerafion_4G_LTE_modules_for_notebooks_and_tablets.aspx on Feb. 19, 2014.
"Wi-Fi Direct—Wikipedia, the free encyclopedia," retrieved from https://en.wikipedia.org/w/index.php?title=Wi-Fi_Direct&oldid=463375983, dated Nov. 30, 2011.
U.S. Notice of Allowance dated Dec. 5, 2016 in U.S. Appl. No. 14/663,996.
U.S. Office Action dated Oct. 26, 2017 in U.S. Appl. No. 15/487,653.

* cited by examiner

ENABLING WIRELESS CONNECTIVITY FOR DEVICES

CROSS-REFERENCE TO RELATED APPLICATIONS

This application is a continuation of and claims priority to U.S. patent application Ser. No. 14/193,356, entitled "Enabling Wireless Connectivity for Devices," filed Feb. 28, 2014, now U.S. Pat. No. 9,451,656, which is incorporated herein by reference in its entirety.

BACKGROUND

Internet connectivity is desirable for some users at times. To address the desire to have Internet connectivity, some consumers purchase smartphones or other devices that can be configured to communicate with wide area networks ("WANs") such as cellular networks, WIMAX networks, or the like. Many modern mobile telephones are Internet-capable and/or may be connected at almost all times.

An emerging sector of the computing device space is tablet computers. Tablet computers are generally sold in two configurations. One popular configuration is a WI-FI enabled version that connects to the Internet via personal and/or local networks such as WI-FI networks or hotspots. A second popular configuration is a WI-FI and WAN enabled version that can connect to the Internet via personal networks, local networks, and/or WAN networks such as cellular networks, or the like. WAN-capable tablet computers are sometimes sold with an embedded transceiver that supports the WAN communications, so there typically is no way to retrofit a WI-FI-only device with WAN connectivity.

Many of tablet computers existing today and/or expected to be sold over the next few years are WI-FI capable, but are not WAN capable. Thus, many tablet computers do not have Internet access unless within range of a WI-FI hotspot or other access point. To remedy this deficiency, these devices must either be coupled to an Internet-capable device (e.g., connected to a smartphone via tethering), or connected to a WI-FI access point. Thus, while WI-FI-only versions of tablet computers often are cheaper than their WAN-enabled counterparts, these devices may lack practical access to the Internet.

Furthermore, even devices that are Internet enabled may not have access to a WAN at some particular time. For example, the devices may be carried into an area that is not covered by a particular carrier, a user's account may be locked for various purposes, or preferences or settings may dictate that network connectivity is unavailable at a particular time. For non-WAN-enabled devices, users may not have any practical way to obtain Internet connectivity without locating a WI-FI network that the user is entitled to use.

SUMMARY

The present disclosure is directed to enabling wireless connectivity for devices. According to various embodiments, a computing device such as a tablet computer can communicate with a peripheral device. The peripheral device can be used to provide extended functionality to the computing device. For example, the peripheral device may be a printer, keyboard, or mouse used with the computing device. These peripheral devices are not WAN-enabled. The computing device can communicate with the peripheral device via a peripheral transceiver. The peripheral transceiver can communicate using a first standard such as BLUETOOTH, ZIGBEE, WIFI, or the like. Thus, the computing device can communicate with the peripheral device for various reasons such as, for example, scanning images, taking pictures, capturing keystrokes or pointing device movements, displaying images or other visual content, combinations thereof, or the like.

According to various embodiments of the concepts and technologies described herein, the peripheral device can include a wireless connectivity module that can be configured to connect to a WAN such as a cellular network, or the like. The wireless connectivity module can include an identity module and a transceiver ("wireless connectivity module transceiver"). The wireless connectivity module transceiver can be a passive transceiver that is activated only upon selection of a switch, or the like, such as a "discover" button that can be included on the peripheral device.

The computing device can pair with the peripheral device. As used herein, "pairing" when used to refer to the computing device and the peripheral device, can be used to refer to a second pairing between the computing device and the peripheral device, since the peripheral may already be paired with the computing device using the peripheral transceiver. As such, selection of the switch can activate the wireless connectivity module transceiver of the peripheral device and initiate a pairing process between the computing device and the wireless connectivity module or the peripheral device. Upon pairing the computing device to the peripheral device, the computing device can control the wireless connectivity module via an application executed by the computing device such as, for example, an access application.

The access application can cause the wireless connectivity transceiver to authenticate with a network and to obtain provisioning of services for the wireless connectivity module. The wireless connectivity module and/or the computing device can determine when authentication and/or provisioning are complete, and begin communicating via the peripheral device. The computing system can exchange data with the peripheral device via the peripheral transceiver, and the peripheral device can exchange data with the network via the wireless connectivity module transceiver. Thus, data from the network can be relayed to the computing device via two transceivers.

According to one aspect of the concepts and technologies disclosed herein, a method is disclosed. The method can include pairing, by a processor executing an access application, with a peripheral device. The processor can initiate provisioning of services to support communication with a network via the peripheral device. The processor can detect completion of the provisioning, and communicate with the network via the peripheral device.

In some embodiments, pairing with the peripheral device can include discovering the peripheral device in a proximity of the processor, and the peripheral device can be in a discover mode in response to activation of a switch of the peripheral device. In some embodiments, the method also can include initiating authentication with the network, and detecting completion of the authenticating. Communicating with the network can include transmitting data to the network via a peripheral transceiver of the peripheral device, and receiving data from the network via the peripheral transceiver.

In some embodiments, the peripheral device can receive the data from the network via a wireless connectivity module included in the peripheral device. The peripheral device can receive the data from the network via a wireless connectivity module transceiver included in the wireless connectivity module. The peripheral transceiver can communicate using a first wireless protocol, and the wireless connectivity module transceiver can communicate using a second wireless protocol.

In some embodiments, the network can include a wide area network. The peripheral device can include a battery that powers the peripheral device, and the battery can power the wireless connectivity module transceiver. In some embodiments, the peripheral device can include a wireless connectivity module transceiver and an identity module, and the wireless connectivity module transceiver can be powered by a battery that powers the peripheral device. In some embodiments, the peripheral device can receive data from the network via a wireless connectivity module transceiver, relay the data to peripheral modules of the peripheral device, and transmit the data to the processor via a peripheral transceiver included in the peripheral modules.

According to another aspect of the concepts and technologies disclosed herein, a device is disclosed. The device can include a processor and a memory. The memory can store computer-executable instructions that, when executed by the processor, cause the processor to perform operations. The operations can include pairing with a peripheral device, initiating provisioning of services to support communication with a network via the peripheral device, detecting completion of the provisioning, and communicating with the network via the peripheral device.

In some embodiments, the device also can include a wireless transceiver that can communicate with the peripheral device via a peripheral transceiver of the peripheral device using a first wireless protocol. The peripheral device can communicate with the network using a wireless connectivity module transceiver using a second wireless protocol. According to some embodiments, communicating with the network can include transmitting data to the network via the peripheral transceiver and the wireless connectivity module transceiver, and receiving data from the network via the peripheral transceiver and the wireless connectivity module transceiver.

In some embodiments, the network can include a wide area network. The peripheral device can include a battery that powers the peripheral device, and the battery can power a wireless connectivity module transceiver via which the peripheral device communicates with the network. In some embodiments, the peripheral device can include a wireless connectivity module transceiver and an identity module, the peripheral device can authenticate with the network using the wireless connectivity module transceiver and the identity module, and the wireless connectivity module transceiver can be powered by a battery that powers the peripheral device.

According to yet another aspect, a computer storage medium is disclosed. The computer storage medium can have computer-executable instructions stored thereon that, when executed by a processor, cause the processor to perform operations. The operations can include pairing with a peripheral device, initiating authenticating of the peripheral device, initiating provisioning of services to support communication with a network via the peripheral device, and detecting completion of the authenticating and the provisioning. The operations also can include communicating with the network via the peripheral device.

In some embodiments, the peripheral device can receive the data from the network via a wireless connectivity module included in the peripheral device. The network can include a wide area network, the peripheral device can include a battery that powers the peripheral device, and the battery can power the wireless connectivity module transceiver. The peripheral device can receive data from the network via a wireless connectivity module transceiver, the peripheral device can relay the data to peripheral modules of the peripheral device, and the peripheral device can transmit the data to the processor via a peripheral transceiver included in the peripheral modules. In some embodiments, the peripheral device can include a data input device, and the network can include a cellular network.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to enabling wireless connectivity for devices. According to various embodiments, a computing device such as a tablet computer can communicate with a peripheral device. The peripheral device can be used to provide functionality to the computing device. For example, the peripheral device may be a printer, keyboard, or mouse used with the computing device. The peripheral device typically may not be WAN-enabled, but according to various embodiments of the concepts and technologies described herein, the peripheral device can include a wireless connectivity module that can be configured to connect to a WAN such as a cellular network, or the like.

The wireless connectivity module can include an identity module and a transceiver ("wireless connectivity module transceiver"). The wireless connectivity module transceiver can be a passive transceiver that is activated upon selection of a switch, or the like, such as a "discover" button that can be included on the peripheral device. The computing device can pair with the peripheral device. Upon pairing the computing device to the peripheral device, the computing device can control the wireless connectivity module via an application executed by the computing device such as, for example, an access application.

The access application can cause the wireless connectivity transceiver to authenticate with a network and to obtain provisioning of services for the wireless connectivity module. The wireless connectivity module and/or the computing device can determine when authentication and/or provisioning are complete, and begin communicating via the peripheral device. The computing system can exchange data with the peripheral device via the peripheral transceiver, and the peripheral device can exchange data with the network via the wireless connectivity module transceiver.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
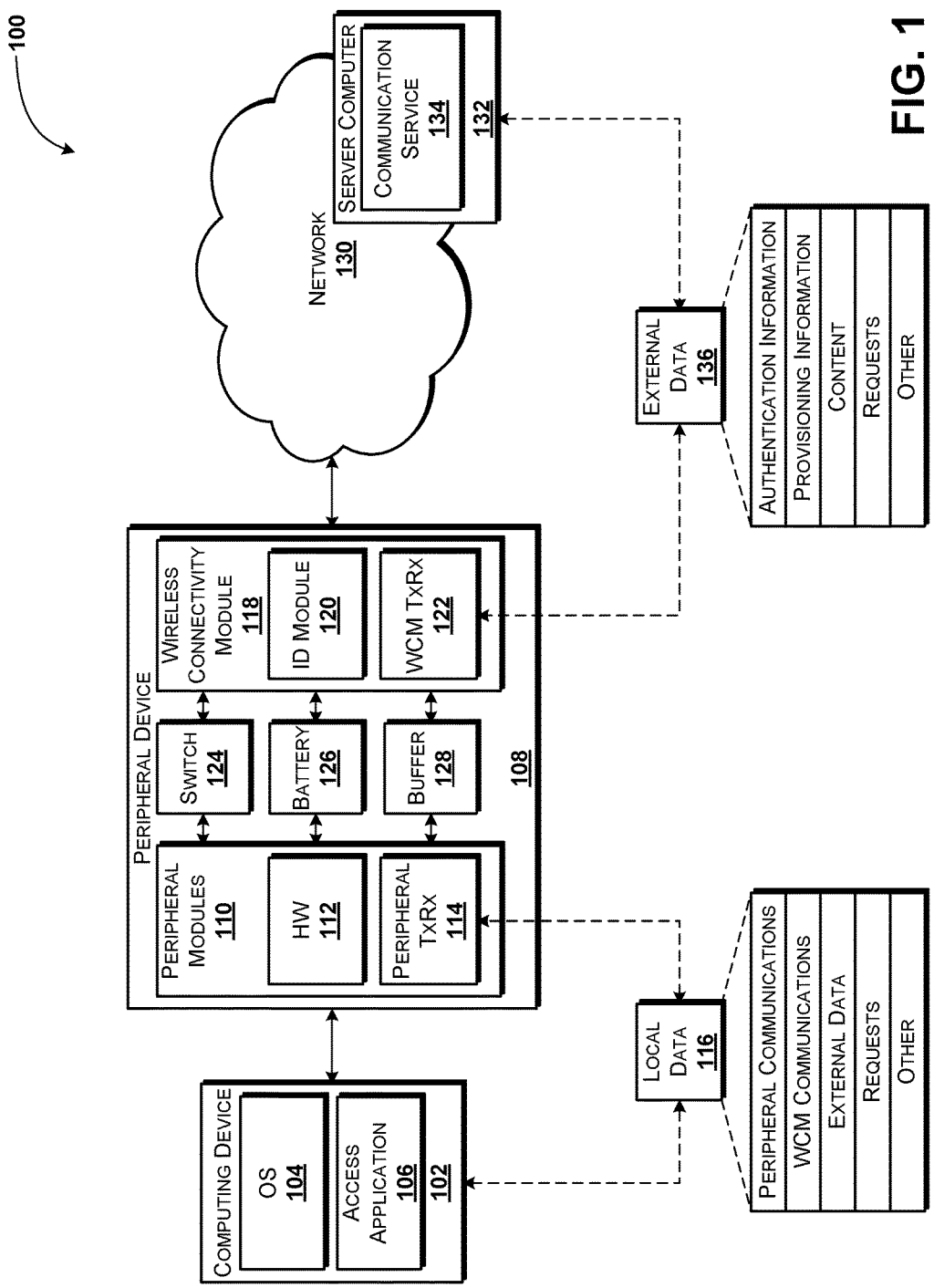
FIG. 1 is a system diagram illustrating an illustrative operating environment for the various embodiments disclosed herein.

Referring now to FIG. 1, aspects of an operating environment 100 for various embodiments of the concepts and technologies disclosed herein for enabling wireless connectivity for devices will be described, according to an illustrative embodiment. The operating environment 100 shown in FIG. 1 includes a computing device 102. According to various embodiments, the functionality of the computing device 102 may be provided by various types of computing devices. In some embodiments, for example, the functionality of the computing device 102 can be provided by one or more server computers, desktop computers, mobile telephones, laptop computers, tablet computers, media players such as a member of the APPLE IPOD family of media player devices from Apple Corporation in Cupertino, Calif., a set-top box ("STB") or set-top unit ("STU"), other computing systems, and the like.

In some other embodiments, the functionality of the computing device 102 can be provided by other types of computing devices such as, for example, vehicle computing systems, global positioning system ("GPS") receivers, GPS navigation devices, wearable computing systems, embedded computing devices for appliances or other systems or structures, smartwatches, smartphones, parking meter computing devices, point-of-sale devices, headwear and/or eyewear such as a member of the GOOGLE GLASS family of computing devices, audio systems such as stereo systems, or the like. The functionality of the computing device 102 also can be provided by desktop phones, computer displays or monitors, camera or monitoring systems, gaming consoles, alarm systems, combinations thereof, or the like. Because the functionality of the computing device 102 can be provided by any device that can execute (via a processor) the various software and/or methods flows described herein, it should be understood that these examples are illustrative and therefore should not be construed as being limiting in any way.

It should be understood that the functionality of the computing device 102 can be provided by a single device, by two similar devices, and/or by two or more dissimilar devices. For purposes of describing the concepts and technologies disclosed herein, the computing device 102 is described herein as a tablet computer or a media player device. It should be understood that this embodiment is illustrative, and should not be construed as being limiting in any way.

Various architectures for the computing device 102 are possible and are contemplated. Some example architectures are illustrated and described herein below, particularly with reference to FIGS. 8-9, and therefore are not illustrated and described completely with reference to FIG. 1. For purposes of illustrating and describing the concepts and technologies described herein, however, it should be understood that various embodiments of the computing device 102 include one or more transceivers or other communication devices such as WI-FI transceivers, input/output ("I/O") ports, or the like, but do not include at least one of a receiver or transceiver for communicating with a wireless wide area network ("WWAN"), or that transceiver is not to be used at a particular time for some reason (e.g., account lock, visiting a foreign country, no coverage, or the like). Thus, in various embodiments of the concepts and technologies described herein, the computing device 102 does not include hardware for directly communicating with cellular networks or other WANs, or that hardware is currently unusable for some reason, but may include hardware for communicating with other local networks and/or devices such as peripherals and the like.

The computing device 102 can execute an operating system 104 and one or more application programs such as, for example, an access application 106. The operating system 104 can include a computer program for controlling the operation of the computing device 102. The access application 106 can include an executable program configured to execute on top of the operating system 104 to provide functionality as described herein for enabling wireless connectivity for devices, as will be described in more detail below.

The computing device 102 can be connected to and/or can communicate with a device such as a peripheral device 108. As used herein, a "peripheral device" can be used to refer to a device that provides extended functionality for the computing device 102 or other devices via connections such as serial connections, universal serial bus ("USB") connections, wireless connections, or the like. As used herein, a "peripheral device" refers to a device that traditionally is not capable of communicating with other devices or networks. According to various embodiments of the concepts and technologies described herein, however, the peripheral devices 108 illustrated and described herein are capable of communicating with other networks and devices, and relaying data from those connections to the computing device 102, as will be explained in more detail herein.

According to various embodiments of the concepts and technologies described herein, the functionality of the peripheral device 108 can be provided by one or more printing devices such as a conventional printer or a three dimensional printer; an imaging device such as a camera, a scanner, a video machine, or the like; a fax machine; a heating or cooling device such as a fan or cooling unit; a location device such as a global positioning system receiver or inertial measurement system; a display or display array; an input device such as a keyboard, joystick, mouse, pointing device, touch pad, track pad, or the like; a touchscreen or other display; a projector; other peripherals; combinations thereof; or the like. The peripheral device 108 also can include an accessory for the computing device 102 such as, for example, a cover, a case, or other accessory such as a member of the BLADE family of accessories from Microsoft Corporation in Redmond, Wash.

The functionality of the peripheral device 108 also can be provided by other types of devices that can be used to extend the functionality of the computing device 102 as described herein. The functionality of the peripheral device 108 also can be provided by any of the example devices that can be used to provide the functionality of the computing device 102 as described herein. In particular, the functionality of the peripheral device 108 also can be provided by smartwatches, smartphones, computing-enabled bracelets, computing-enabled key chains, and/or other devices that can have an architecture similar to the peripheral device 108 show in FIG. 1. For purposes of illustrating and describing the concepts and technologies described herein, the peripheral device 108 is described herein with reference to one contemplated embodiment in which the peripheral device 108 is a keyboard. In light of the various types of peripheral devices that are contemplated and possible, it should be understood that this example is illustrative and therefore should not be construed as being limiting in any way.

The peripheral device 108 can include one or more peripheral modules 110. The peripheral modules 110 can provide functionality associated with the peripheral device 108. As such, the peripheral modules 110 can include hardware ("HW") 112. In the example of a keyboard, the hardware 112 can include one or more keys and various associated hardware for detecting keystrokes and providing indications of the keystrokes to the computing device 102. Thus, the hardware 112 can include circuitry, springs, processors, memory devices, or the like. Of course, in other embodiments of the peripheral device 108, the hardware 112 can include additional or alternative structures appropriate for the functionality provided by the peripheral device 108.

The peripheral modules 110 also can include a peripheral transceiver ("peripheral TxRx") 114. The peripheral transceiver 114 can be configured to communicate with the computing device 102 to exchange local data 116. The local data 116 can include various types of data communication such as, for example, peripheral communications, wireless connectivity module communications, external data, requests, and other data. The peripheral communications can include instructions for controlling the peripheral device 108 such as commands to scan a document, a command to activate or deactivate the peripheral device 108, a command to download photographs, combinations thereof, or the like; data output from the peripheral device such as keystrokes, images, video, location data, combinations thereof, or the like; and/or other communications.

The wireless connectivity module communications can include instructions, commands, or the like, for controlling a wireless connectivity module 118. Thus, the wireless connectivity module communications can include instructions to authenticate, instructions to change or adjust communication speeds, or other types of instructions for controlling the functionality of the wireless connectivity module 118 and/or any of the components of the wireless connectivity module 118. Using the wireless connectivity module communications, the computing device 102 and/or the access application 106 executed by the computing device 102 can control the function of the wireless connectivity module 118. These functions of the access application 106 are described in more detail below.

The external data can include data exchanged between the wireless connectivity module 118 and other networks, devices, or the like. The external data is described in more detail below. The requests can include any requests such as web page requests, connection requests, rate requests, or other requests that may be generated by the access application 106 for requesting functionality from network devices or other devices. The other information can include any other types of data and information. The local data 116 can be communicated and/or exchanged with the computing device 102 using the peripheral transceiver 114. It should be understood that the functionality of the peripheral transceiver 114 can be provided by a wired and/or a wireless device.

According to one contemplated embodiment of the concepts and technologies described herein, the functionality of the peripheral transceiver 114 can be provided by various wireless technologies such as, for example, WI-FI, BLUETOOTH, ZIGBEE, and/or other wireless communication technologies. As is generally understood, the data transfer rates of these and other wireless technologies can vary from several kilobits (kbps) per second up to tens or even hundreds of megabits per second (Mbps). Nonetheless, the peripheral transceiver 114 generally may be used to pass small amounts of data that represent, for example, keystrokes, print commands, image data, or the like, and therefore may not be used to transmit other types of data. Thus, in some embodiments a data connection between the computing device 102 and the peripheral transceiver 114 may include surplus data transfer bandwidth. It should be understood that this example is illustrative and therefore should not be construed as being limiting in any way. Because the data communications between computing devices and peripheral devices 108 generally are understood, these communications will not be further described herein.

According to various embodiments of the concepts and technologies described herein, the peripheral device 108 also can include a wireless connectivity module ("WCM") 118. The wireless connectivity module 118 can include an identification ("ID") module 120 and a wireless connectivity module transceiver 122, which can operate in accordance with standards, protocols, and/or frequencies that differ from standards, protocols, and/or frequencies with which the peripheral transceiver 114 communicates.

According to various embodiments, the identification module 120 can include one or more of a subscriber identity module ("SIM"), a Universal Integrated Circuit Card ("UICC"), and/or other authentication hardware and/or software. The identification module 120 includes one or more applications that are executable by the identification module 120 to enable the peripheral device 108 to authenticate with a network element or other device. According to various embodiments, the functionality of the identification module 120 can be provided by a CDMA-SIM ("CSIM"), a Universal-SIM ("USIM"), an IP Multimedia Services Identity Module ("ISIM"), a Removable User Identity Module ("RUIM"), a WILLCOM-SIM ("W-SIM"), other devices, combinations thereof, and the like. It should be understood that the functionality of the identification module 120 also can be provided by a micro-SIM, a mini-SIM, a smart card, and/or other hardware and software modules. Therefore, for purposes of the claims, the phrase "identification module" is used expansively to include UICC's, SIM's, CSIM's, USIM's, ISIM's, RUIM's, W-SIM's, and the like, in full or compact sizes. In some embodiments, the functionality of the identification module is provided by a non-removable SIM card. Because the functionality of the identification module 120 can be provided by additional and/or alternative devices, it should be understood that these examples are illustrative and therefore should not be construed as being limiting in any way.

According to various embodiments, the wireless connectivity module transceiver 122 can be configured to provide communications with one or more wide area networks ("WANs") and/or other networks. For example, the wireless connectivity module transceiver 122 can be configured to communication with one or more elements of a cellular network or other WAN, as will be illustrated and described herein in further detail below. Thus, the wireless connectivity module transceiver 122 can transmit data from the identification module 120 to network elements and/or other devices to authenticate the peripheral device 108 with the network elements and/or other devices. These and other aspects of authentication of the peripheral device 108 are illustrated and described in detail below.

The peripheral device 108 also can include a switch 124, a battery 126, and a buffer 128. The switch 124 can include a hardware or software switch that, when activated, causes activation of the wireless connectivity module 118 and/or of the wireless connectivity module transceiver 122. In some embodiments, the switch 124 is a hardware switch that is pressed or otherwise activated by a user. Upon activation of the switch 124, the wireless connectivity module 118 and/or the wireless connectivity module transceiver 122 can be activated as illustrated and described herein. Thus, the wireless connectivity module 118 of the peripheral device 108 can be configured not to consume power unless the switch 124 has been activated, which can thereby provide a passive device for connecting the computing device 102 to a network node or other device.

The battery 126 can be provided to power the peripheral modules 110. Thus, the battery 126 can power a keyboard receiver and/or transmitter, a mouse receiver or transmitter, displays, power and/or time backup devices, combinations thereof, or the like. According to various embodiments of the concepts and technologies described herein, the wireless connectivity module 118 can be configured to draw power from the battery 126 when the wireless connectivity module 118 is activated (e.g., via interaction with the switch 124). Thus, various embodiments of the wireless connectivity module 118 are configured to not draw power unless activated. Furthermore, various embodiments of the wireless connectivity module 118 are configured to omit a dedicated power source, thereby relieving users of the recharging batteries and/or multiple sets of batteries. Rather, the wireless connectivity module 118 can draw power from the battery 126, which can be the same battery that powers the peripheral modules 110. It should be understood that these example embodiments are illustrative and therefore should not be construed as being limiting in any way.

The buffer 128 can be a memory or other data storage device that can be configured to store data. According to various embodiments, the buffer 128 is optional and can be included to buffer data being transferred between the peripheral modules 110 and the wireless connectivity module 118, or the computing device 102 and another device or network, as will be explained in more detail below. Thus, if the wireless connectivity module transceiver 122 transfers data at a rate that exceeds a data transfer rate of the peripheral transceiver 114, the buffer 128 can be used to allow matching of data rates and/or otherwise support the data transfer. Because functionality associated with data buffers generally is understood and known, the buffer 128 is not described further herein.

Although not shown in FIG. 1, the peripheral device 108 and/or the wireless connectivity module 118 can include other hardware and/or software such as signal processors, or the like. Thus, for example, the wireless connectivity module 118 can be configured to provide onboard processing of data and/or compression, and the like. In some other embodiments, the wireless connectivity module 118 does not include a processor, or the like. Rather, signal processing, compression, or the like, are provided by the access application 106 executed by the computing device 102. This is the embodiment shown in FIG. 1. Thus, some embodiments of the peripheral device 108, for example the embodiment shown in FIG. 1, can omit or may not include a processor associated with the wireless connectivity module 118. It should be understood that this example is illustrative and therefore should not be construed as being limiting in any way.

The wireless connectivity module 118 can be configured to communicate with a network 130 or a device associated with and/or in communication with the network 130. Although not shown in FIG. 1, the wireless connectivity module 118 can access the network 130 using various wireless protocols and as such, the network 130 can correspond to and/or can include a cellular network or other wide area network ("WAN"). Thus, the wireless connectivity module 118 can access the network 130 via one or more antennas and radios as will be explained in more detail below with reference to FIG. 7.

In some embodiments, communications from the wireless connectivity module 118 can be routed to or through a sever computer 132. The server computer 132 can host or execute various modules, applications, and/or other software such as, for example, a communication service 134. The communication service 134 can be configured to interact with the wireless connectivity module 118 to authenticate and provision services to the wireless connectivity module 118. The communication service 134 can exchange external data 136 with the wireless connectivity module 118. As used herein, "external data" is data that is obtained by the wireless connectivity module 118 from the network 130 and/or data provided to the network 130 by the wireless connectivity module 118 and thus is "external" from the peripheral device 108 when originally obtained by the peripheral device 108 and/or a component thereof. It should be understood that this example is illustrative and therefore should not be construed as being limiting in any way.

The external data 136 can include, for example, authentication information, provisioning information, content, requests, and other information or data. The authentication information can include, for example, data generated by the identification module 120. Thus, the authentication information can include data such as that used by cellular telephones to authenticate the cellular telephone on a network, though the data can be used to authenticate the wireless connectivity module 118 with the network 130 instead. Other types of authentication information can be stored in the identification module 120 such as, for example, login and password information, an international mobile subscriber identity ("IMSI"), an international mobile equipment identity ("MEI"), a device serial number, combinations thereof, or the like. Because authentication information can include additional and/or alternative types of information used for authentication and/or reflecting that authentication is complete, it should be understood that these examples are illustrative and therefore should not be construed as being limiting in any way.

The provisioning information can include information that indicates that services have been provisioned to the wireless connectivity module 118. Thus, the provisioning information can indicate completion of a provisioning process and/or can indicate specific parameters of a connection or service such as voice and/or data connectivity. Thus, the provisioning information can include data identifying services, data rates, transfer speeds, frequencies, channel information, or the like. Because provisioning information can include additional and/or alternative types of information used for and/or reflecting completion of provisioning, it should be understood that these examples are illustrative and therefore should not be construed as being limiting in any way.

According to various embodiments, the access application 106 can be configured to communicate with the peripheral device 108 via the peripheral transceiver 114. At any time, a user or other entity can activate the switch 124 to cause the peripheral device 108 to enter or activate a discovery or pair mode. The discovery mode (also referred to herein as "discover mode") can be used to find devices configured to communicate with the computing device 102, and the pair mode can be used to pair a computing device 102 with a peripheral device 108 and/or a wireless connectivity module 118.

The access application 106 can issue instructions, commands, and/or requests for controlling the function of the wireless connectivity module 118. As such, the access application 106 can control the wireless connectivity module 118 as if the wireless connectivity module 118 is internal to the computing device 102, though the wireless connectivity module 118 is external to the computing device 102. Furthermore, communications between the computing device 102 and the wireless connectivity module 118 can be routed to the wireless connectivity module 118 via the peripheral transceiver 114 and optionally through other components as illustrated and described in FIG. 1. As such, embodiments of the concepts and technologies described herein enable a computing device 102 that lacks an ability to access the network 130, whether because of hardware limitations, software limitations, account limitations, or other reasons, to access the network 130 via interactions with the peripheral device 108. These and other aspects of the concepts and technologies described herein will be described below in detail.

FIG. 1 illustrates one computing device 102, one peripheral device 108, one network 130, and one server computer 132. It should be understood, however, that various implementations of the operating environment 100 may include zero, one, or more than one computing device 102, zero, one, or more than one peripheral device 108, zero, one, or more than one network 130, and/or zero, one, or more than one server computer 132. As such, the illustrated embodiment should be understood as being illustrative, and should not be construed as being limiting in any way.

Figure 2:
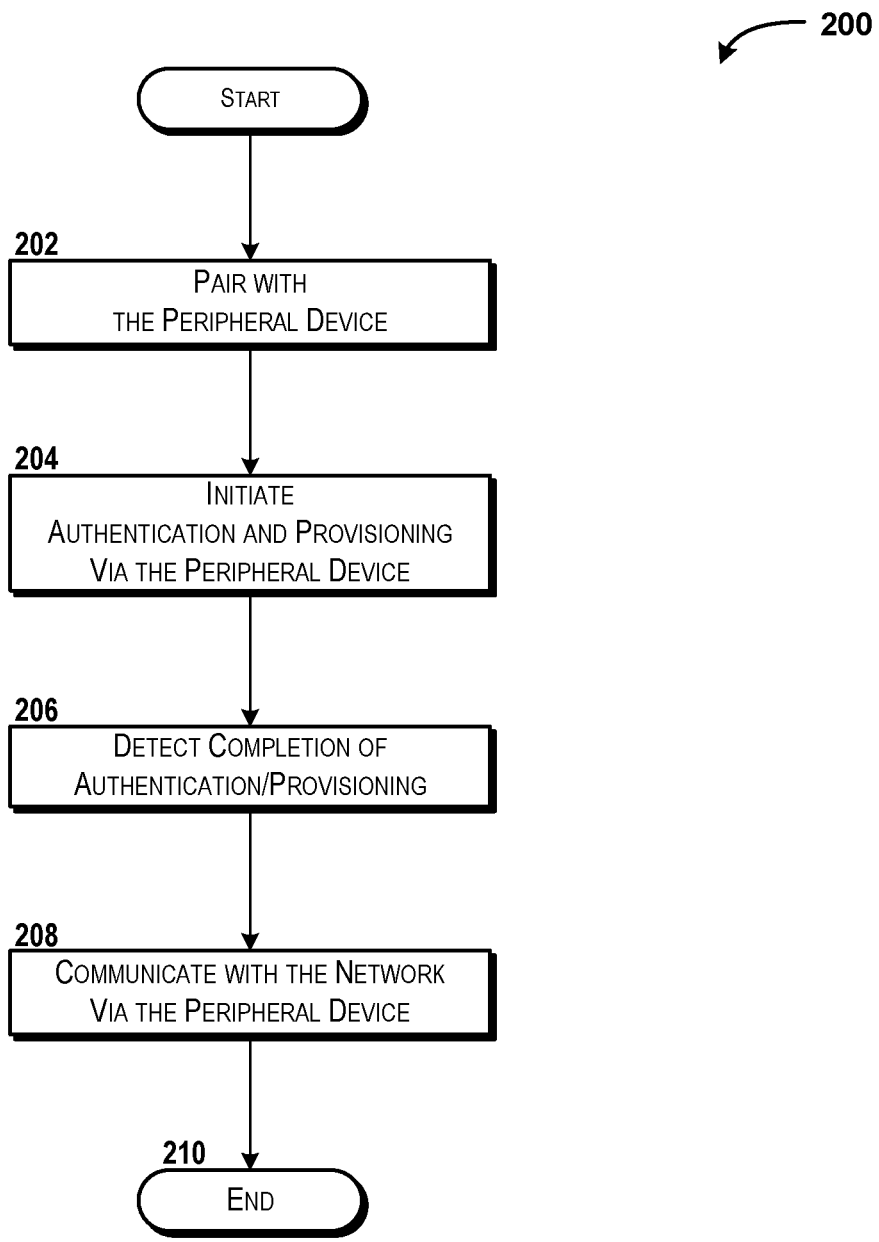
FIG. 2 is a flow diagram showing aspects of a method for initiating communications using a peripheral device, according to an illustrative embodiment.

Turning now to FIG. 2, aspects of a method 200 for initiating communications via a peripheral device 108 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, the computing device 102 to perform one or more operations and/or causing the processor to direct other components of the computing system or device to perform one or more of the operations.

For purposes of illustrating and describing the concepts of the present disclosure, the methods disclosed herein are described as being performed by the computing device 102, the peripheral device 108, and/or the server computer 132 via a process flow and/or via execution of one or more hardware or software modules, and/or execution of computer-executable instructions such as, for example, the access application 106 and/or the communication service 134. It should be understood that additional and/or alternative devices and/or network nodes can provide the functionality described herein via execution of one or more hardware or software modules, applications, or the like. Thus, the illustrated embodiments are illustrative, and should not be viewed as being limiting in any way.

The method 200 begins at operation 202. At operation 202, the computing device 102 pairs with a device such as the peripheral device 108. Although not illustrated in FIG. 2, it should be understood that pairing the devices can include, for example, discovering peripheral devices in a vicinity of the computing device 102, selecting a peripheral device with which pairing is to be completed, and activating the peripheral device 108 for the pairing by, for example, activating the wireless connectivity module transceiver 122 or the like.

During pairing, the computing device 102 can search a vicinity or proximity of the computing device 102 for compatible devices within communication range. In some embodiments of the concepts and technologies described herein, a user or other entity may press a button, activate a switch, select a UI control, and/or otherwise activate an option to enter a pair mode of operation at the peripheral device 108. In some embodiments, the peripheral device 108 includes a hard or soft switch such as the switch 124 shown in FIG. 1. When the switch 124 is activated, the peripheral device 108 can enter a pair mode for pairing with the computing device 102. Thus, some embodiments of the wireless connectivity module 118 of the peripheral device 108 can omit a processor or the like, since these functions may be prompted by hardware switches. It should be understood that this example is illustrative and therefore should not be construed as being limiting in any way.

With the peripheral device 108 in a pair mode or similar mode of operation, the computing device 102 can discover the peripheral device 108. Thus, while the computing device 102 may already be in communication with the peripheral device 108 via the peripheral transceiver 114, the computing device 102 can discover the wireless connectivity module 118 and/or the availability of the wireless connectivity module transceiver 122 via information known and/or discovered about the wireless connectivity module 118 via communications via the peripheral transceiver 114. The computing device 102 can be configured to present one or more user interfaces for completing a discovery and/or pair operation with the peripheral device 108, in some embodiments. Some example user interfaces that can be presented during the discovery and/or pair operations are illustrated and described below with reference to FIGS. 5A-5B.

From operation 202, the method 200 proceeds to operation 204. At operation 204, the computing device 102 can initiate authentication and provisioning via the peripheral device 108. The computing device 102 can be configured to control the wireless connectivity module 118 via the peripheral transceiver 114. As such, the computing device 102 can issue instructions to the wireless connectivity module 118 via the peripheral transceiver 114, and the peripheral modules 110 can be configured to relay the instructions to the wireless connectivity module 118. In some embodiments, the instructions can be relayed via a buffer 128, though the buffer 128 can be omitted in other embodiments. Also, while the illustrated wireless connectivity module 118 omits a processor, some embodiments of the wireless connectivity module 118 can include a processor or other hardware for performing operations on the data exchanged between the network 130 and the computing device 102 (e.g., signal conversion, rate control, or the like).

According to various embodiments, the computing device 102 can instruct the wireless connectivity module 118 to authenticate the peripheral device 108 or the wireless connectivity module 118 thereof with the network 130. In some embodiments, the authentication can be completed by the wireless connectivity module 118 via a data exchange with an authentication server or other application such as the communication service 134, which can be hosted by a computer such as the server computer 132. The wireless connectivity module 118 can use data stored in the identification module 120, for example, to complete the authentication process. The communication service 134 or other devices on the network 130 can complete the authentication process, provision services to the wireless connectivity module 118, and send a message or other data to the wireless connectivity module 118 indicating that authentication and provisioning are complete.

From operation 204, the method 200 proceeds to operation 206. At operation 206, the computing device 102 detects completion of the authentication of the wireless connectivity module 118 with the network 130, as well as provisioning of services to the wireless connectivity module 118. According to various embodiments, a message or other data can be sent by the network 130, for example via the communication service 134 and/or as or with the external data 136, to the wireless connectivity module 118. The message or data can be relayed to the peripheral modules 110, which can send or relay the information to the computing device 102, for example via the peripheral transceiver 114. Thus, the computing device 102 can determine, based upon data sent to the wireless connectivity module 118, that authentication and/or provisioning of services is complete for the wireless connectivity module 118. Because the computing device 102 can be configured to detect completion of the authentication and/or provisioning in additional and/or alternative manners, it should be understood that this example is illustrative and therefore should not be construed as being limiting in any way.

From operation 206, the method 200 proceeds to operation 208. At operation 208, the computing device 102 can communicate with the network 130 via the peripheral device 108. In practice, the computing device 102 can generate a request or other data (e.g., a web address request in a browser, a request for network information, or the like). The computing device 102 can send this request to the peripheral device 108, for example as part of the local data 116. The peripheral device 108 can receive the request via the peripheral transceiver 114. In some embodiments, the peripheral modules 110 can recognize the request as being associated with the wireless connectivity module 118, for example via a format, protocol, heading, or the like.

The peripheral modules 110 can relay or send the request to the wireless connectivity module 118, and the wireless connectivity module 118 can forward, relay, or otherwise transmit the request to the network 130 and/or a device operating on the network 130 such as the communication service 134. In some embodiments, the request can be included in the external data 136, though this is not necessarily the case. The element of the network 130 communicated with by the computing device 102 can receive the request and respond, in some embodiments. In some embodiments, the response can pass through the same elements as the request, or different elements. For example, the request or the response may also pass through the buffer 128, though this is not necessarily the case. As such, the computing device 102 can be configured to communicate with the network 130 using the peripheral device 108.

From operation 208, the method 200 proceeds to operation 210. The method 200 ends at operation 210.

Figure 3:
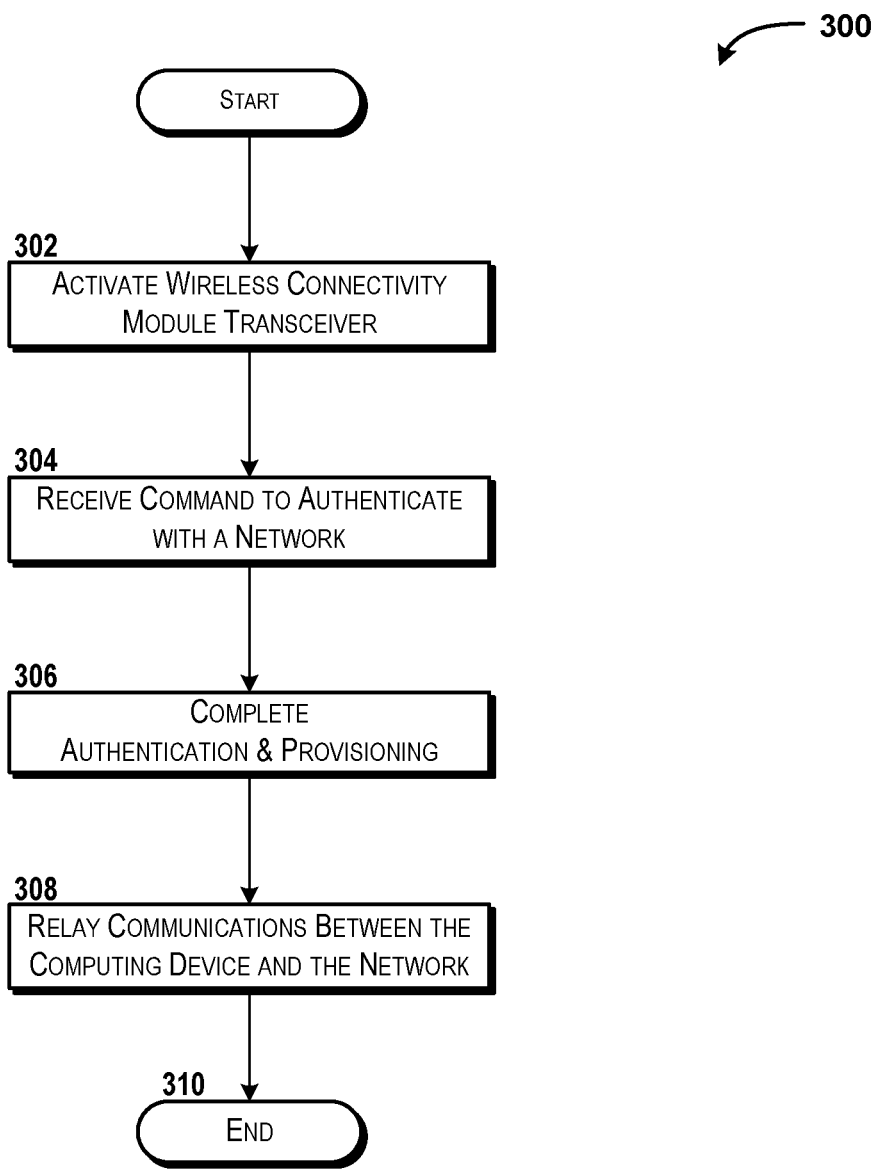
FIG. 3 is a flow diagram showing aspects of a method for communicating using a peripheral device, according to another illustrative embodiment.

Turning now to FIG. 3, aspects of a method 300 for communicating using a peripheral device 108 will be described in detail, according to an illustrative embodiment. The method 300 is described as being performed by the peripheral device 108. It should be understood that the operations of the method 300 can be performed by the peripheral device 108 via instructions or control of the computing device 102 and/or a processor associate with the computing device 102. In some other embodiments, some or all of the operations of the method 300 can be performed at the peripheral device 108 via process flows caused by hardware modules as described above. Thus, the described embodiment, wherein the method 300 is performed by the peripheral device 108, should be understood as being illustrative and should not be construed as being limiting in any way.

The method 300 begins at operation 302. At operation 302, the peripheral device 108 activates the wireless connectivity module transceiver 122. According to various embodiments, the peripheral device 108 can activate the wireless connectivity module transceiver 122 in response to activation of a hard or soft switch associated with the peripheral device 108, for example the switch 124 shown in FIG. 1. In some other embodiments, the peripheral device 108 can activate the wireless connectivity module transceiver 122 based upon an instruction received at the peripheral device 108. Because the peripheral device 108 can activate the wireless connectivity module transceiver 122 in response to various instructions and/or interactions with the peripheral device 108, it should be understood that these examples are illustrative and therefore should not be construed as being limiting in any way.

From operation 302, the method 300 proceeds to operation 304. At operation 304, the peripheral device 108 can receive a command to authenticate with a network such as the network 130. The command can be received by the peripheral device 108 from a device such as the computing device 102, which can communicate with the peripheral device 108 via the peripheral transceiver 114 or other means. As explained above, the command or instruction to authenticate can correspond to a request that may be generated by the computing device 102, though this is not necessarily the case. The command to authenticate also can be automatically generated, for example, upon powering on of the wireless connectivity module 118 and/or selection or activation of the switch 124. Because the command to authenticate with the network 130 can be received in various manners, it should be understood that these examples are illustrative and therefore should not be construed as being limiting in any way.

From operation 304, the method 300 proceeds to operation 306. At operation 306, the peripheral device 108 can complete authentication and/or provisioning. Although not separately illustrated in FIG. 3, it should be understood that the peripheral device 108 can transmit authentication information to the network 130 or a device associated with the network 130 such as the server computer 132. The network 130 can authenticate the peripheral device 108 and provision services to the peripheral device 108. Thus, operation 306 can correspond to the peripheral device 108 requesting authentication and obtaining an indication that the peripheral device 108 has authenticated and been provisioned services. It should be understood that this example is illustrative and therefore should not be construed as being limiting in any way.

From operation 306, the method 300 proceeds to operation 308. At operation 308, the peripheral device 108 can relay communications between the computing device 102 and the network 130. According to various embodiments, the wireless connectivity module 118 can receive data from the network 130. The wireless connectivity module 118 can relay the data to the peripheral modules 110. In some embodiments, the data is relayed via a buffer 128, though this is not necessarily the case. Also, as explained above, some embodiments of the peripheral device 108 include processors and/or signal processing for relaying the data from the wireless connectivity module 118 to the peripheral modules 110, though other embodiments omit these and other types of hardware to reduce power consumption and/or sophistication of the wireless connectivity module 118.

From the peripheral modules 110, the data can be relayed to the computing device 102. As noted above, the peripheral transceiver 114 can relay the data. Thus, while the peripheral transceiver 114 typically may transmit only data associated with peripheral device 108, for example key stroke information, image data, print commands, or the like, the peripheral transceiver 114 according to various embodiments of the concepts and technologies described herein can be configured to also transmit the data from the network 130 to the computing device 102. These data communications can occur via a communication channel typically used only for communications with the peripheral device 108 by the computing device 102. Thus, embodiments of the concepts and technologies described herein can be used to use an existing peripheral communication channel to support communications between the computing device 102 and the network 130. It should be understood that this example is illustrative and therefore should not be construed as being limiting in any way.

From operation 308, the method 300 proceeds to operation 310. The method 300 ends at operation 310.

Figure 4:
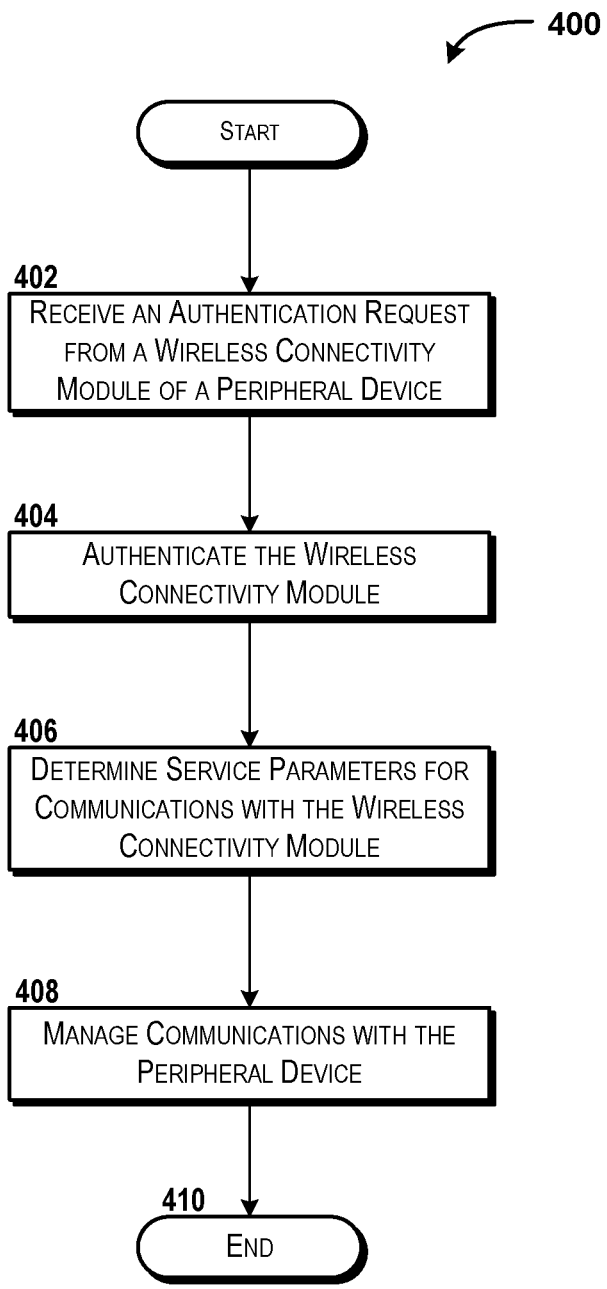
FIG. 4 is a flow diagram showing aspects of a method for communicating with a computing device via a peripheral device, according to another illustrative embodiment.

Turning now to FIG. 4, aspects of a method 400 for communicating with a computing device 102 via a peripheral device 108 will be described in detail, according to an illustrative embodiment. The method 400 is described as being performed by the server computer 132. It should be understood that the operations of the method 400 can be performed by the server computer 132 via execution of instructions such as the communication service 134. It should be understood that additional and/or alternative devices and/or network nodes can provide the functionality described herein via execution of one or more hardware or software modules, applications, or the like. Thus, the described embodiment, wherein the method 400 is performed by the server computer 132 should be understood as being illustrative and should not be construed as being limiting in any way.

The method 400 begins at operation 402. At operation 402, the server computer 132 receives an authentication request from a wireless connectivity module 118 of a peripheral device 108. The authentication request can request authentication of the peripheral device 108, or a wireless connectivity module 118 of the peripheral device 108, with the network 130. In response to the request, the server computer 132 can request authentication information from the peripheral device 108. It should be understood that in some embodiments, the authentication information can be included with the request.

From operation 402, the method 400 proceeds to operation 404. At operation 404, the server computer 132 authenticates the wireless connectivity module 118. The server computer 132 and/or the communication service 134 executed on the server computer 132 can authenticate the wireless connectivity module 118 using the authentication information. In some embodiments, the server computer 132 can pass the authentication information to other devices or nodes (e.g., a AAA server), while in some other embodiments the server computer 132 can perform various lookups, or the like, in databases associated with the network 130. Thus, the server computer 132 can be configured to authenticate the wireless connectivity module 118, or pass data to other network elements responsible for authentication of the wireless connectivity module 118.

From operation 404, the method 400 proceeds to operation 406. At operation 406, the server computer 132 determines service parameters for communications with the wireless connectivity module 118. The server computer 132 can determine capabilities of the wireless connectivity module 118, account settings or preferences associated with the wireless connectivity module 118, and/or other information. For example, the server computer 132 can determine a data transfer speed associated with a particular account and apply those parameters to communications via the wireless connectivity module 118. Similarly, the server computer 132 can determine that the wireless connectivity module 118 is configured to handle particular communication protocols, rates, frequencies, or the like, and apply those parameters to communications with the wireless connectivity module 118.

From operation 406, the method 400 proceeds to operation 408. At operation 408, the server computer 132 manages communications with the peripheral device 108. The server computer 132 can apply the parameters determined in operation 406 to communications occurring between the network 130 and the peripheral device 108. In some embodiments, traffic can pass through or be controlled by the server computer 132, and the server computer 132 can control the rate and/or bandwidth of the communications. In some other embodiments, the server computer 132 can set particular protocols used during the communications between the network 130 and the peripheral device 108. Other parameters are possible and are contemplated, so it should be understood that the server computer 132 can control the communications, the rate of the communications, and/or other aspects of the communications.

From operation 408, the method 400 proceeds to operation 410. The method 400 ends at operation 410.

Figure 5A:
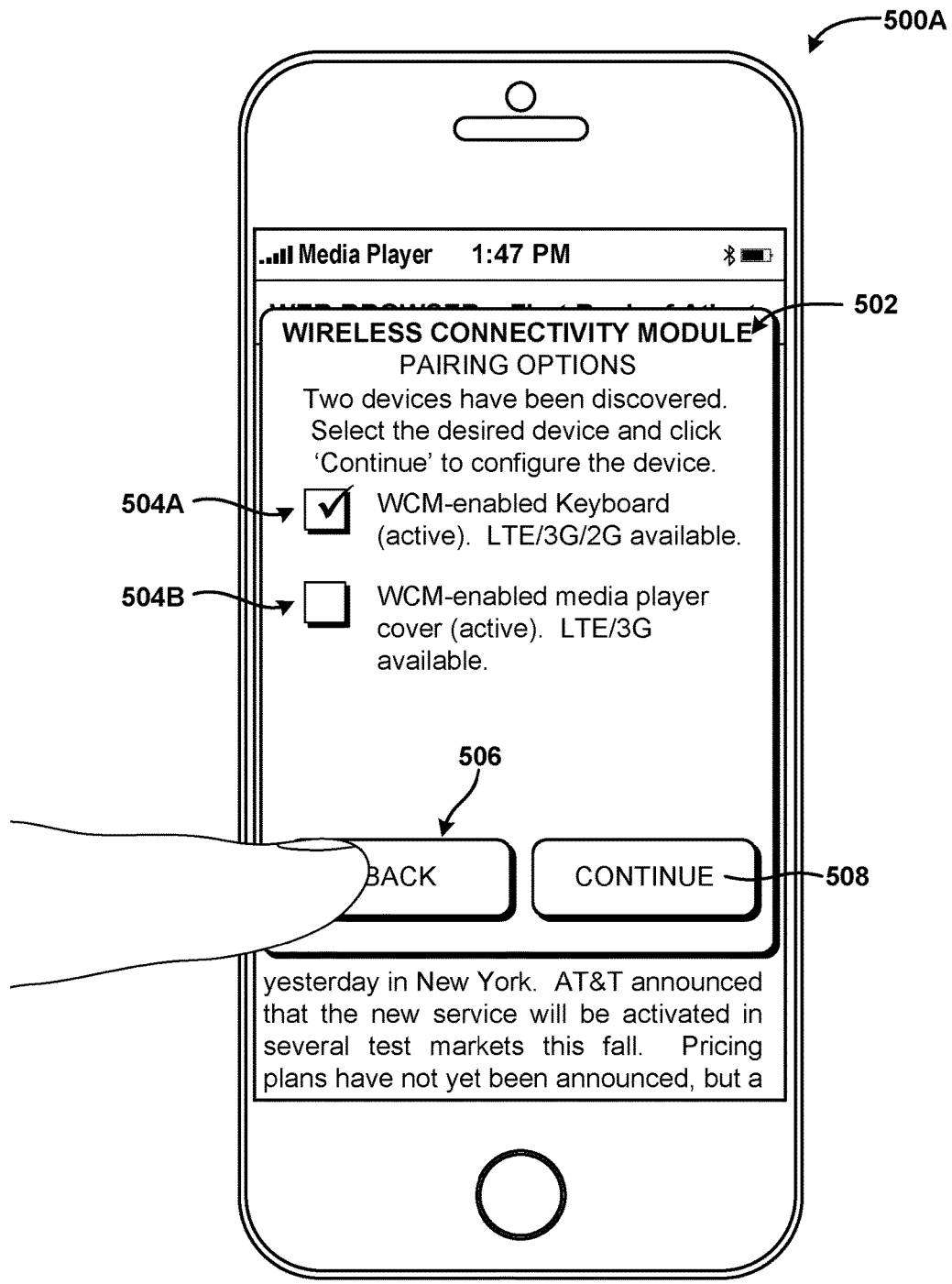
FIGS. 5A-5B are user interface drawings showing aspects of the concepts and technologies described herein for communicating using a peripheral device, according to some illustrative embodiments.
Figure 5B:
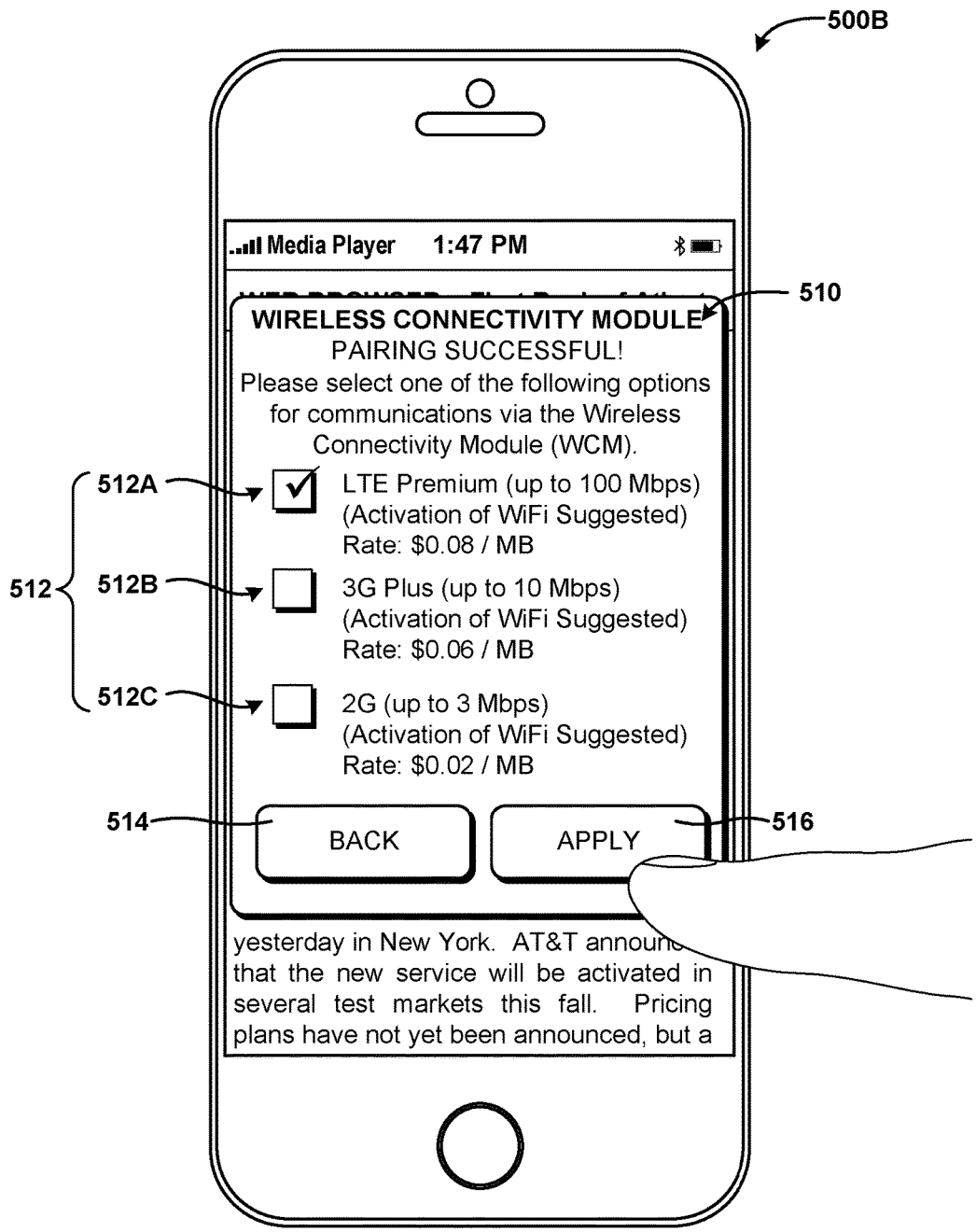

FIGS. 5A-5B are user interface ("UI") diagrams showing aspects of UIs for communicating using a peripheral device 108, according to some illustrative embodiments. FIG. 5A shows an illustrative screen display 500A. The screen display 500A can be generated by a device such as the computing device 102. According to various embodiments, the computing device 102 can generate the screen display 500A and/or other screen displays in conjunction with and/or based upon execution of the access application 106 and/or based upon data received from the peripheral device 108 and the communication service 134 described herein. It should be appreciated that the UI diagram illustrated in FIG. 5A is illustrative of one contemplated example of the UIs that can be generated and/or displayed in accordance with the concepts and technologies disclosed herein, and therefore should not be construed as being limited in any way.

The screen display 500A can include various menus and/or menu options (not shown in FIG. 5A). The screen display 500A also can include wireless connectivity module pairing options window (hereinafter referred to as the "pairing options window") 502. The pairing options window 502 can be used to indicate, to a user or other entity associated with the computing device 102, a list of discovered peripheral devices 108 in the vicinity of the computing device 102 that are enabled for communications with a network such as the network 130. In some embodiments, the network 130 can correspond to a wireless wide area network ("WWAN") such as a cellular network, a WIMAX network, or the like. It can be appreciated from the above description that the screen display 500A illustrated in FIG. 5A can be generated in response to a discovery and/or pair operation as illustrated and described above with reference to operation 202 of FIG. 2. It should be understood that this example is illustrative and therefore should not be construed as being limiting in any way.

The pairing options window 502 can indicate that a discovery process has been completed and can indicate one or more peripheral devices 108 in communication range of the computing device 102 that are enabled to support communication with a network such as the network 130. In the illustrated embodiment, the pairing options window 502 includes two indications 504A-B, which can correspond to two peripheral devices 108 that are capable of supporting communications with a network. It should be understood that any number of devices may be displayed in the pairing options window 502.

As shown in FIG. 5A, the indications 504A-B can indicate, for each peripheral device 108, a type of peripheral device, a status of the peripheral device (active or inactive), and connectivity availability for the peripheral device. Because the pairing options window 502 can include additional and/or alternative indicators in addition to, or instead of the indications 504A-B, it should be understood that this example is illustrative and therefore should not be construed as being limiting in any way.

The pairing options window 502 can include a UI control 506 for going back to a previous screen display such as, for example, a screen displaying an option to pair with a peripheral device 108, a display showing available connections, combinations thereof, or the like. The pairing options window 502 also can include a UI control 508. Selection of the UI control 508 can cause the computing device 102 to continue to another screen display for pairing with the peripheral device 108. Because additional and/or alternative actions can be taken in response to selection of one or more of the UI controls 506, 508, it should be understood that these embodiments are illustrative, and should not be construed as being limiting in any way.

Referring now to FIG. 5B, a UI diagram showing additional aspects of the concepts and technologies disclosed herein for communicating using a peripheral device 108 are described in detail. In particular, FIG. 5B shows an illustrative screen display 500B generated by a device such as the computing device 102. It should be appreciated that the UI diagram illustrated in FIG. 5B is illustrative of one contemplated example of the UIs that can be generated and/or displayed in accordance with the concepts and technologies disclosed herein, and therefore should not be construed as being limited in any way.

The screen display 500B can include a connectivity options window 510. The connectivity options window 510 can be used to present one or more connectivity options to a user or other entity. It can be appreciated that the connectivity options window 510 can be presented in response to a user selecting the UI control 510 shown in FIG. 5A. Because the connectivity options window 510 can be displayed at additional and/or alternative times, it should be understood that this embodiment is illustrative, and should not be construed as being limiting in any way.

The connectivity options window 510 can include one or more connectivity option indicators 512A-C (hereinafter collectively and/or generically referred to as "connectivity option indicators 512"). The connectivity option indicators 512 can indicate a one or more connectivity options supported by a peripheral device with which the computing device 102 is paired. In the illustrated embodiment, the connectivity options window 510 includes three connectivity option indicators 512, which can correspond to three operation modes of the peripheral device 108.

In particular, the connectivity option indicator 512A can correspond to an option to communicate using long term evolution ("LTE") or fourth generation ("4G") technologies, which in the illustrated embodiment is illustrated as supporting data transfer rates of up to one hundred megabits per second ("Mbps") for download links and transfer rates of up to fifty Mbps for upload links. The connectivity option indicator 512A also can include instructions, such as a suggestion to activate a WI-FI transceiver of the computing device 102, and a price rate for the connectivity. It should be understood that the information included with the connectivity option indicator 512A is merely illustrative, and that additional and/or other indications are possible. Furthermore, it should be understood that the connectivity option indicators 512 may not include pricing as the service may be included in a rate plan, charged as a flat fee, or otherwise provided and/or paid for by users. As such, the illustrated embodiment is illustrative and should not be construed as being limiting in any way.

The connectivity option indicator 512B can correspond to an option to communicate using third generation ("3G") technologies, which in the illustrated embodiment is illustrated as supporting data transfer rates of up to ten megabits per second ("Mbps") for download links and transfer rates of up to three Mbps for upload links. The connectivity option indicator 512B also can include instructions, such as a suggestion to activate a WI-FI transceiver of the computing device 102, and a price rate for the connectivity. It should be understood that the information included with the connectivity option indicator 512B is merely illustrative, and that additional and/or other indications are possible. As such, the illustrated embodiment is illustrative and should not be construed as being limiting in any way.

The connectivity option indicator 512C can correspond to an option to communicate using second generation ("2G") technologies, which in the illustrated embodiment is illustrated as supporting data transfer rates of up to three megabits per second ("Mbps") for download links and transfer rates of up to two hundred kbps for upload links. The connectivity option indicator 512C also can include instructions, such as a suggestion to activate a WI-FI transceiver of the computing device 102, and a price rate for the connectivity. It should be understood that the information included with the connectivity option indicator 512C is merely illustrative, and that additional and/or other indications are possible. As such, the illustrated embodiment is illustrative and should not be construed as being limiting in any way.

The screen display 500B also can include a UI control 514 for exiting the presentation of the connectivity options window 510 and a UI control 516 for applying a selection made in the screen display 500B. Thus, selection of one of the UI controls 514, 516 can cause the computing device 102 to hide the connectivity options window 510 and display other screen displays. It should be understood that this example is illustrative and therefore should not be construed as being limiting in any way.

Figure 6A:
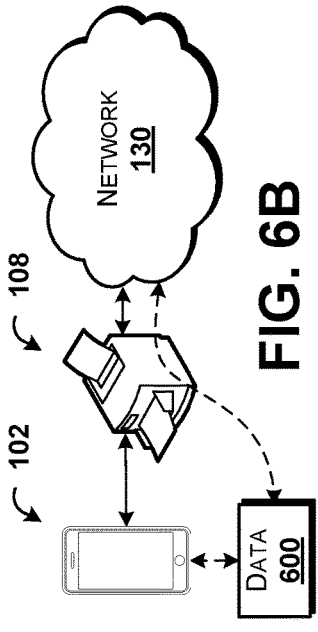
FIGS. 6A-6D are line diagrams showing aspects of the concepts and technologies described herein for communicating using a peripheral device, according to some illustrative embodiments.

FIGS. 6A-6D illustrate various aspects of the concepts and technologies described herein for communicating using a peripheral device 108. As illustrated in FIG. 6A, a computing device 102 can exchange data 600 with a network 130 via a peripheral device 108. It should be understood that the data 600 shown in FIGS. 6A-6D can include the local data 116 and/or the external data 136 illustrated and described in FIG. 1, though this is not necessarily the case.

Figure 6C:
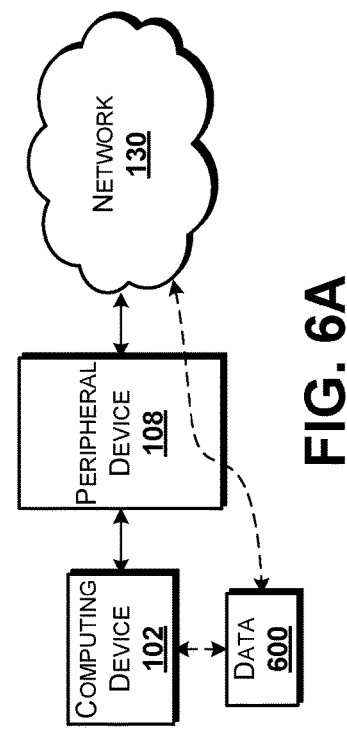
Figure 6B:
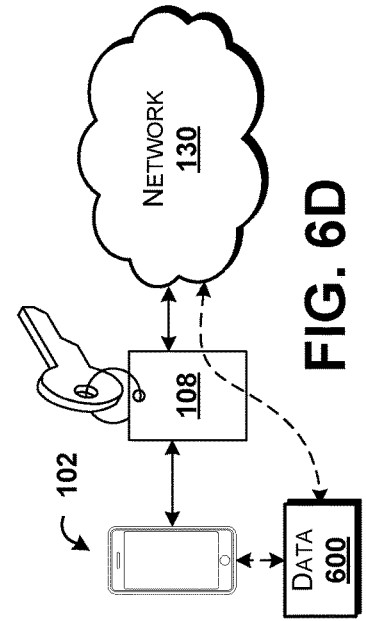
Figure 6D:
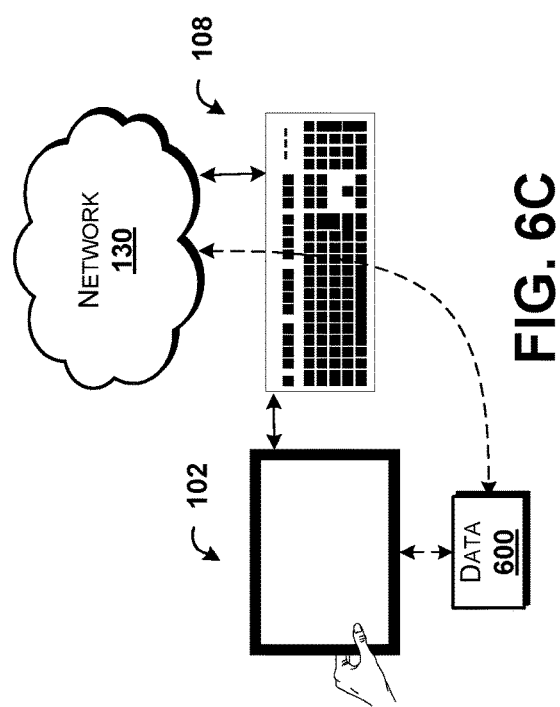

As shown in FIG. 6B, another embodiment of the concepts and technologies described herein is shown. In FIG. 6B, the computing device 102 can include a legacy smartphone or media device, and can communicate with an upgraded network such as the network 130 via a peripheral device 108 such as a printer. It should be understood that this example is illustrative and therefore should not be construed as being limiting in any way. As shown in FIG. 6C, the computing device 102 can include a tablet computer, and the peripheral device 108 can include a keyboard. As shown in FIG. 6D, the computing device 102 can include a smartphone or media player, and the peripheral device 108 can include a keychain. It should be understood that these examples are illustrative and therefore should not be construed as being limiting in any way.

Figure 7:
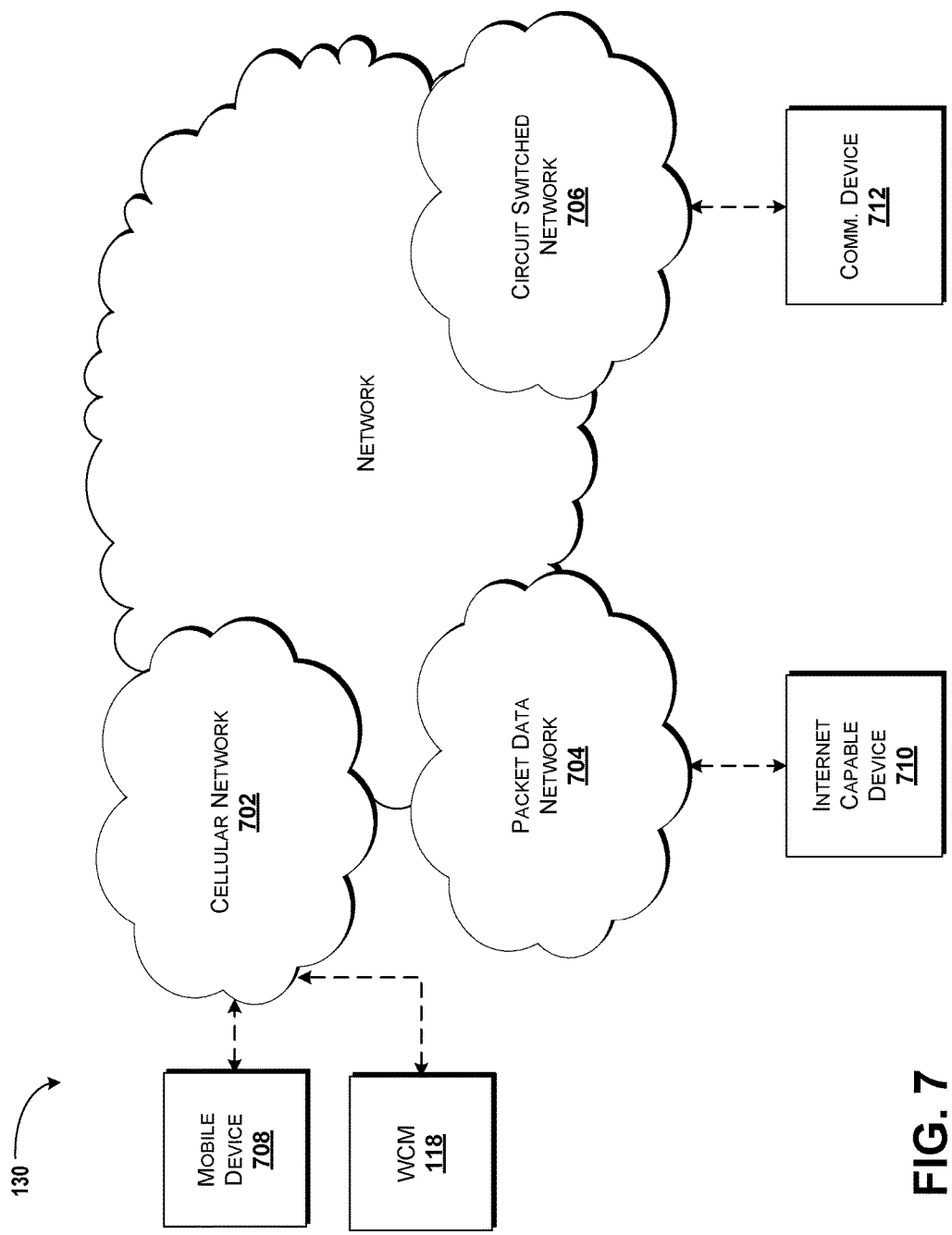
FIG. 7 schematically illustrates a network, according to an illustrative embodiment.

Turning now to FIG. 7, additional details of the network 130 are illustrated, according to an illustrative embodiment. The network 130 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708 such as, for example, a cellular telephone, a user equipment, a mobile terminal, a PDA, a laptop computer, a handheld computer, and combinations thereof, can be operatively connected to the cellular network 702. Other devices such as, for example, the peripheral device 108 illustrated and described herein also can be connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 130 is used to refer broadly to any combination of the networks 702, 704, 706. It should be appreciated that substantially all of the functionality described with reference to the network 130 can be performed by the cellular network 702, the packet data network 704, and/or the circuit switched network 706, alone or in combination with other networks, network elements, and the like.

Figure 8:
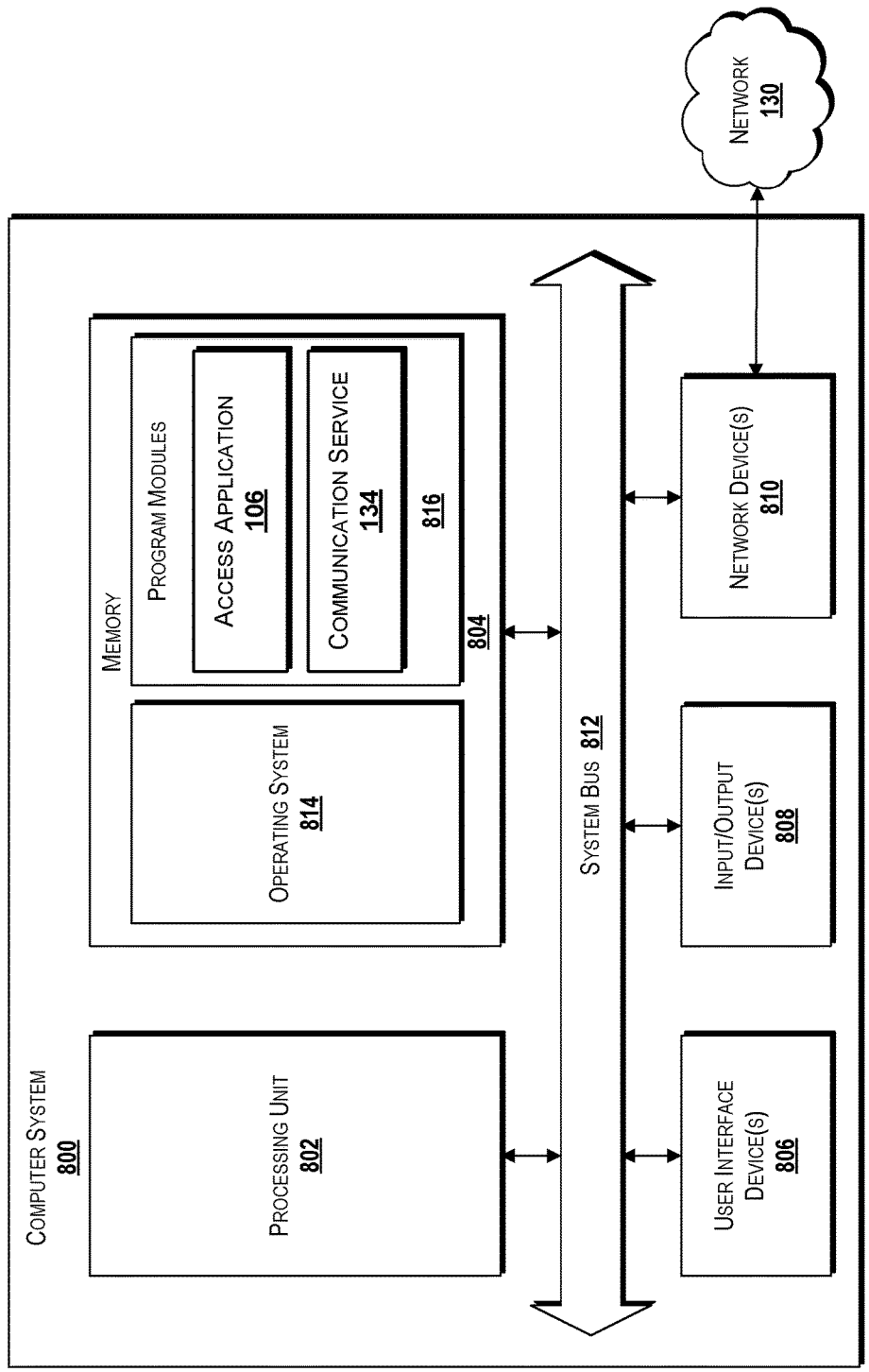
FIG. 8 is a block diagram illustrating an example computer system configured to communicate using a peripheral device, according to some illustrative embodiments.

FIG. 8 is a block diagram illustrating a computer system 800 configured to provide the functionality described herein for enabling wireless connectivity for devices, in accordance with various embodiments of the concepts and technologies disclosed herein. The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer 132. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 804 can communicate with the processing unit 802 via the system bus 812. In some embodiments, the memory 804 can be operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the access application 106 and/or the communication service 134. This and/or other programs can be embodied in computer-readable media containing instructions that, when executed by the processing unit 802, perform one or more of the methods 200, 300, 400 described in detail above with respect to FIGS. 2-4. According to some embodiments, the program modules 816 may be embodied in hardware, software, firmware, or any combination thereof. Although not shown in FIG. 8, it should be understood that the memory 804 also can be configured to store the local data 116, the external data 136, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media as defined herein.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network, such as the network 130. Examples of the network devices 810 include, but are not limited to, a modem, a radio frequency ("RF") or infrared ("IR") transceiver, a telephonic interface, a bridge, a router, or a network card. The network 130 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 130 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 9:
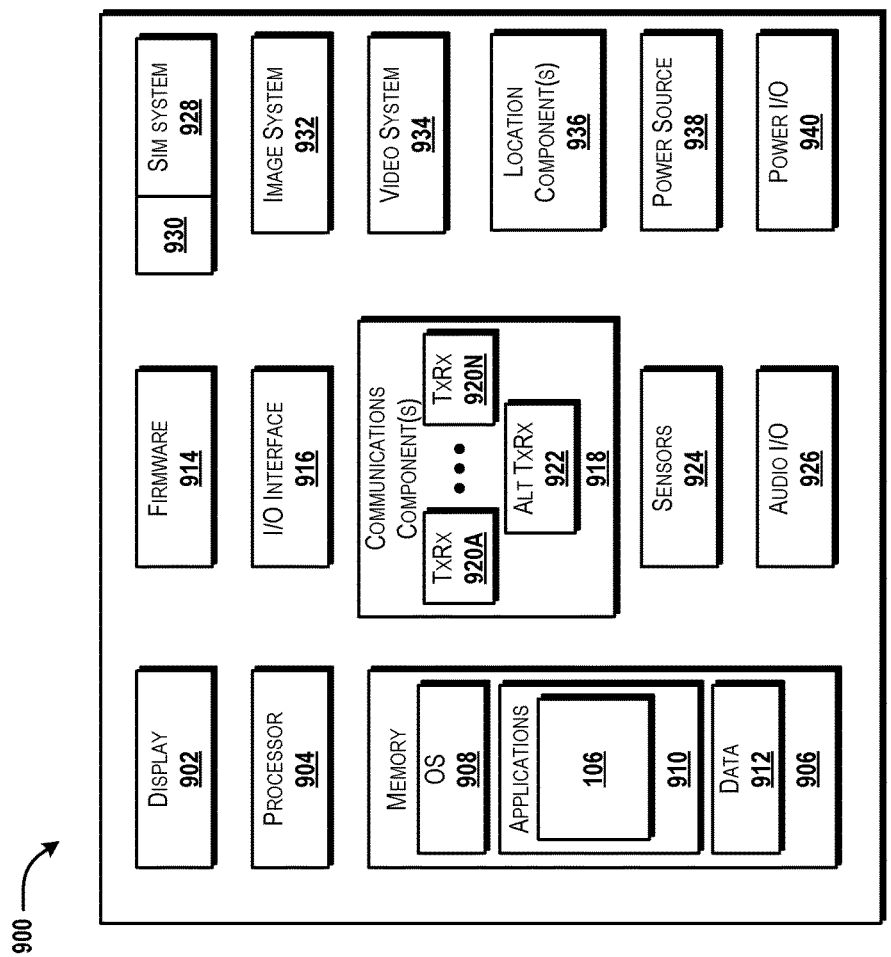
FIG. 9 is a block diagram illustrating an example mobile device configured to interact with a peripheral device, according to some illustrative embodiments.

Turning now to FIG. 9, an illustrative mobile device 900 and components thereof will be described. In some embodiments, the computing device 102 described above with reference to FIG. 1 can be configured as and/or can have an architecture similar or identical to the mobile device 900 described herein in FIG. 9. It should be understood, however, that the computing device 102 may or may not include the functionality described herein with reference to FIG. 9. In particular, the computing device 102 as described herein can include various transceivers, but may be unable to connect to a network such as the network 130. For example, an account may be locked, out of minutes, out of data allocated, or the like, and the concepts and technologies described herein therefore can be used to allow the computing device 102 to connect to the network 130. It should be understood that these examples are illustrative and therefore should not be construed as being limiting in any way.

While connections are not shown between the various components illustrated in FIG. 9, it should be understood that some, none, or all of the components illustrated in FIG. 9 can be configured to interact with one other to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various graphical user interface ("GUI") elements for discovering and/or pairing with peripheral devices 108, options to initiate and/or terminate connections, text, images, video, virtual keypads and/or keyboards, messaging data, notification messages, metadata, internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910 such as the access application 106, other computer-executable instructions stored in a memory 906, or the like. In some embodiments, the applications 910 also can include a UI application (not illustrated in FIG. 9).

The UI application can interface with the operating system 908, such as the operating system 104 shown in FIG. 1, to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering content, discovering peripheral devices 108, pairing with peripheral devices 108, selecting options for communicating via the peripheral devices 108, configuring settings, manipulating address book content and/or settings, multimode interaction, interacting with other applications 910, and otherwise facilitating user interaction with the operating system 908, the applications 910, and/or other types or instances of data 912 that can be stored at the mobile device 900. The data 912 can include, for example, the local data 116, the external data 136, and/or other applications or program modules.

According to various embodiments, the data 912 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, requests, commands, instructions, user information, organization information, presence status information, user IDs, passwords, and application initiation (startup) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks such as the network 130 described herein. As noted above, however, the computing device 102 may be unable to connect to the network 130 due to travel restrictions, account locks or restrictions, traffic constraints, or the like.

Similarly, the network 130 may be upgraded at some time (e.g., from 4G to 5G, or the like), and as a result, the mobile device 900 (or the computing device 102 described herein) may be unable to access the network 130. Thus, embodiments of the concepts and technologies described herein can be used, for example, to provide a legacy device with the ability to connect to an upgraded or evolved network, device, or service. The concepts and technologies described herein also can be used to supplement or add redundancy to services or capabilities of the mobile device 900 (or the computing device 102). Thus, for example, if the mobile device 900 (or the computing device 102) is configured to communicate with the network 130 using a particular standard or protocol, for example, the peripheral device 108 may be used to add a redundant connection to the network 130 to increase speed or reliability of the connection and/or for other reasons. In some embodiments, other networks include networks that utilize non-cellular wireless technologies such as WI-FI or WIMAX. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using GSM, CDMAONE, CDMA2000, LTE, and various other 2G, 2.5G, 3G, 4G, and greater generation technology standards. Moreover, the communications component 918 may facilitate communications over various channel access methods (which may or may not be used by the aforementioned standards) including, but not limited to, TDMA, FDMA, W-CDMA, OFDM, SDMA, and the like.

In addition, the communications component 918 may facilitate data communications using GPRS, EDGE, the HSPA protocol family including HSDPA, EUL or otherwise termed HSUPA, HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another mobile device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

The various embodiments of the concepts and technologies described herein have been described as being used to provide WAN access to a computing device 102 that was unable to access the WAN accessed by the peripheral device 108 for any of various reasons. As explained above, these reasons could include lack of a transceiver configured to communicate with the WAN; an account lock, preference, or setting; an access control setting or issue; the computing device 102 being located in another carrier's network (with which the computing device 102 may not be configured to communicate); travel out of a compatible network; combinations thereof; or the like. The various embodiments of the concepts and technologies described herein also can be used to cover other situations such as, for example, when a network or network device is upgraded, and the computing device 102 is a legacy device that is not capable of communicating with the upgraded network. In such circumstances, the concepts and technologies described herein can be used to allow the computing device 102 to access the upgraded network via a capable peripheral device 108, thereby obviating the need to upgrade the computing device 102. It should be understood that these examples are illustrative and therefore should not be construed as being limiting in any way.

Furthermore, while various embodiments of the concepts and technologies described herein have been described as supporting WAN connectivity, the peripheral device 108 also can be configured to provide access to other services and/or products. This access can be automatic and/or hardcoded into the computing device 102 and/or peripheral device 108. For example, in some embodiments the peripheral device 108 can be configured to access softphone services, television services, location services, or the like. Thus, for example, a computing device 102 can be configured to access, via the peripheral device 108, services such as the WATSON family of human/device interface products from AT&T Inc.

It should be understood that that computing device 102 can be configured to access, via the peripheral device 108, other human/device interfaces and/or products. As such, this is merely one example of a service that can be accessed by the computing device 102 via the peripheral device 108. Other contemplated examples include the UVERSE family of Internet, Television, and Phone services from AT&T Inc., as well as other alarm, health monitoring, home monitoring, camera, and audio devices. In some embodiments, the peripheral device 108 and/or the functionality of the peripheral device 108 can be tied or locked to a particular service provider to ensure the peripheral device 108 is used with the service provider's networks, services, and/or devices. Conversely, a computing device 102 that is locked for a particular service provider's networks, services, and/or devices, can effectively be "unlocked" using an embodiment of the peripheral device 108, wherein the peripheral device 108 can communicate with another service provider's networks, services, and/or devices. Because various products and services can be accessed using the concepts and technologies described herein, it should be understood that these examples are illustrative and therefore should not be construed as being limiting in any way.

Based on the foregoing, it should be appreciated that systems and methods for enabling wireless connectivity for devices have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    pairing, by a first device comprising a processor, with a peripheral device that comprises a peripheral transceiver and a wireless connectivity module that comprises a wireless connectivity module transceiver, wherein the processor of the first device provides control instructions to the wireless connectivity module to cause the wireless connectivity module to initiate a connection between the wireless connectivity module transceiver and a network; and
    communicating, by the first device, with the network via the connection.

2. The method of claim 1, further comprising:
    discovering the peripheral device in a proximity of the processor, wherein the peripheral device is in a discover mode in response to activation of a switch of the peripheral device.

3. The method of claim 1, wherein initiating the connection comprises:

initiating, by the processor of the first device, authentication of the peripheral device with the network; and detecting, by the processor of the first device, completion of the authenticating.

4. The method of claim 1, wherein communicating with the network comprises:

transmitting data to the network via the peripheral device; and receiving data from the network via the peripheral device.

5. The method of claim 1, wherein the peripheral device is a cover for the first device.

6. The method of claim 1, wherein the peripheral device is an input device that is configured to provide user input to the first device.

7. The method of claim 1, wherein the peripheral device is a display that is configured to display output from the first device comprises an output device.

8. The method of claim 1, wherein initiating the connection comprises:

initiating, by the processor of the first device, provisioning of services by the network to the wireless connectivity module of the peripheral device; and detecting, by the processor of the first device, completion of the provisioning.

9. The method of claim 1, wherein the network comprises a wide area network, wherein the peripheral device comprises a battery that powers the peripheral device, and wherein the battery powers the wireless connectivity module transceiver.

10. The method of claim 6, wherein the input device is a keyboard.

11. A device comprising:

a processor; and a memory that stores computer-executable instructions that, when executed by the processor, cause the processor to perform operations comprising:

pairing with a peripheral device that comprises a peripheral transceiver and a wireless connectivity module that comprises a wireless connectivity module transceiver, wherein the processor provides control instructions to the wireless connectivity module to cause the wireless connectivity module to initiate a connection between the wireless connectivity module transceiver and a network, and communicating with the network via the connection.

12. The device of claim 11, wherein the peripheral device is a cover for the device.

13. The device of claim 11, wherein the peripheral device is an input device that is configured to provide user input to the device.

14. The device of claim 11, wherein the peripheral device is a display that is configured to display output from the device.

15. The device of claim 11, wherein initiating the connection comprises:

initiating provisioning of services by the network to the wireless connectivity module of the peripheral device; and detecting completion of the provisioning.

16. A computer storage medium having computer-executable instructions stored thereon that, when executed by a processor, cause the processor to perform operations comprising:

pairing, by a device, with a peripheral device that comprises a peripheral transceiver and a wireless connectivity module that comprises a wireless connectivity module transceiver, wherein the device provides control instructions to the wireless connectivity module to cause the wireless connectivity module to initiate a connection between the wireless connectivity module transceiver and a network; and communicating, by the device, with the network via the connection.

17. The computer storage medium of claim 16, wherein the peripheral device is a cover for the device.

18. The computer storage medium of claim 16, wherein the peripheral device is a display that is configured to display output from the device.

19. The computer storage medium of claim 16, wherein the peripheral device is an input device that is configured to provide input to the device.

20. The computer storage medium of claim 16, wherein initiating the connection comprises:

initiating provisioning of services by the network to the wireless connectivity module of the peripheral device; and detecting completion of the provisioning.

* * * * *